United States Patent [19]

Satran

[11] Patent Number: 4,992,007
[45] Date of Patent: Feb. 12, 1991

[54] CUTTING INSERT AND A TOOL HOLDER THEREFOR

[75] Inventor: Amir Satran, Kirat Bialik, Israel

[73] Assignee: Iscar Ltd., Nahariya, Israel

[21] Appl. No.: 414,582

[22] Filed: Sep. 27, 1989

Related U.S. Application Data

[63] Continuation of Ser. No. 237,990, Aug. 29, 1988, abandoned.

[30] Foreign Application Priority Data

Oct. 14, 1987 [IL] Israel ........................................ 84171

[51] Int. Cl.⁵ ........................ B23B 27/08; B23B 29/14
[52] U.S. Cl. ................................. 407/110; 407/114;
 407/116; 407/117
[58] Field of Search ............... 407/110, 113, 114, 115,
 407/116, 117

[56] References Cited

U.S. PATENT DOCUMENTS

| | | | |
|---|---|---|---|
| 3,364,544 | 1/1968 | Urranic | 407/115 |
| 3,653,107 | 4/1972 | Hertel | 407/113 |
| 3,815,191 | 6/1974 | Holma | 407/116 |
| 3,820,211 | 6/1974 | Kus | 407/116 |
| 4,583,887 | 4/1986 | Wertheimer | 407/116 |
| 4,602,897 | 7/1986 | Teets | 407/113 |
| 4,693,641 | 9/1987 | Tsujimura et al. | 407/114 |
| 4,776,733 | 10/1988 | Petterson | 407/114 |
| 4,778,311 | 10/1988 | Niemi | 407/116 |

Primary Examiner—William E. Terrell
Attorney, Agent, or Firm—Burgess, Ryan and Wayne

[57] ABSTRACT

A metal cutting insert of substantially polygonal shape having top, bottom, front, rear and side faces; a front cutting edge being formed at the intersection of the top and the front face and first and second side cutting edges formed respectively at the intersections of the top and the two side faces, chip forming means being located on the top face within an area defined by the cutting edges; the top and bottom faces being respectively of convex and concave disposition.

9 Claims, 5 Drawing Sheets

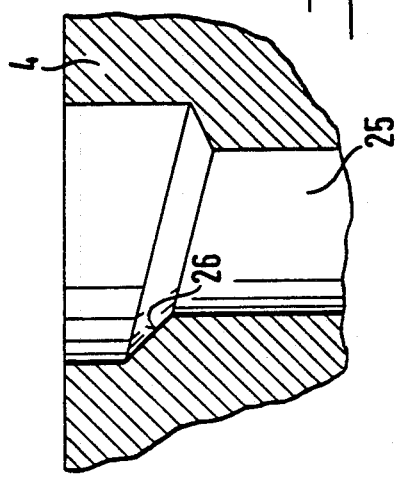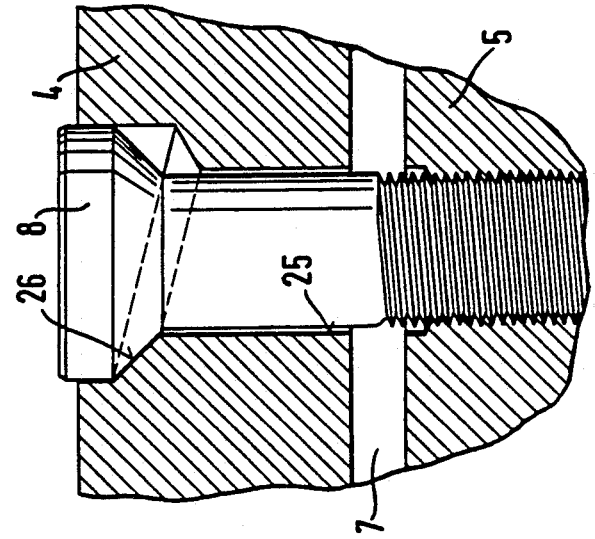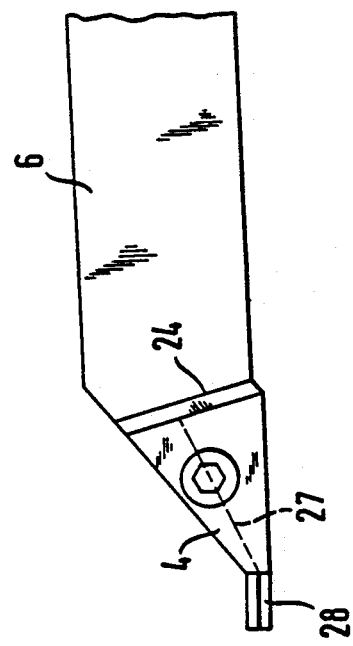

4,992,007

CUTTING INSERT AND A TOOL HOLDER THEREFOR

This application is a continuation of application Ser. No. 237,990, filed Aug. 29, 1988 abandoned.

FIELD OF THE INVENTION

This invention relates to a cutting insert formed of a hard wear-resistant material such as, for example, a cemented hard metal carbide and intended for use in metal grooving, parting, turning or boring operations. The invention also relates to a tool holder for use with such an insert.

BACKGROUND OF THE INVENTION

Such inserts are generally of the replaceable kind and are designed to be firmly held in an appropriate receiving seat formed in an insert holder. Thus, for example, the insert can be formed with a tapering, wedge-shaped body so as to be wedge clamped within a correspondingly wedge-shaped slot formed in the insert holder. Alternatively, the insert can be clamped between a pair of jaws of the insert holder, which jaws define a receiving slot, the jaws being biased into clamping the insert by suitable mechanical means.

Seeing that the metal cutting operations involve the removal (from the workpiece being cut) of metal, in the form of chips, the interests of safety and efficiency of cutting require that these chips be effectively removed from the cutting region. To this end it has long been known to provide such cutting inserts with chip breaking and/or forming means so as to ensure that the chips, shortly after their formation, are so shaped and/or broken that they can be readily removed from the work area without interfering with the continuing cutting process and without endangering the operating personnel.

In the use of such cutting inserts for the purposes indicated, it has long been known to draw a distinction between tools for parting or grooving operations, on the one hand, and tools for lateral turning (e.g. cylindrical) operations, on the other hand. In the first instance, there is a radial movement of the tool into the rotating workpiece to be grooved or parted whilst, in the second instance, there is a lateral or transverse movement of the tool. When carrying out these differing kinds of operations, it has long been known that it is necessary to replace the holder and the cutting insert when passing from one operation to the other, seeing that the cutting insert employed for any particular operation is designed so as to meet only the requirements of that operation.

This necessity to replace the cutting insert in accordance with the nature of the cutting operation is clearly time-consuming and requires the ready availability of differing kinds of operations. In the light of this existing situation, the applicants have developed a new tool cutting system known by the applicants' trademark CUT-GRIP, wherein the same cutting insert can be used for both parting and grooving operations, on the one hand, and also for lateral turning operations, on the other hand. Such an insert will hereinafter be referred to as a "multidirectional cutting tool insert".

Such multidirectional cutting tool inserts are adapted to be held by specially designed tool holders having a pair of gripping jaws formed integral therewith and with each other, the gripping jaws defining between them a receiving slot within which the insert is to be clamped, this receiving slot communicating with an elongated slit formed in the holder and extending longitudinally therein away from the slot. A screw clamping means extends through the tool holder in the region of the slit so that, upon insertion of the insert into the slot, tightening of the screw clamping means results in the uppermost jaw being biased into a tight clamping relationship with the upper surface of the insert. Preferably, the adjacent surfaces of the insert and the jaws are formed with mating keying surfaces to as to ensure the correct alignment of the insert and so as to prevent its lateral displacement once it is clamped in the tool holder.

Hitherto, in order to clamp multidirectional inserts of this kind with the inserts being directed at acute angles with respect to the longitudinal axes of the tool holders, it was necessary for the lowermost jaws of the tool holders to define acute angles at their outermost corners. Seeing that the tool holder and especially the outermost corners thereof have to be capable of withstanding considerable forces during operation, it will be readily appreciated that the fact that the outermost corner defines an acute angle, of necessity implies that the corner is relatively weak and can be subjected to breakage under stress.

BRIEF SUMMARY OF THE INVENTION

It is therefore an object of the present invention to provide a multidirectional cutting insert of a new kind by means of which it is possible to overcome the above-referred-to disadvantage. It is also an object of the present invention to provide a new form of tool holder for use with such a multidirectional cutting insert in accordance with the invention.

According to the present invention there is provided a metal cutting insert of substantially polygonal shape having top and bottom faces and front, rear and a pair of side peripheral faces; a front cutting edge formed at the intersection of the top face and the front peripheral face and first and second slide cutting edges formed respectively at the intersections of the top face and the two side peripheral faces and chip forming means located on the top face within an area defined by the cutting edges, characterized in that the top and bottom faces are respectively of convex and concave dispositions.

As used in the present specification the terms "convex and concave dispositions" include both convexly and concavely arced surfaces as well as surfaces which are formed of a plurality of successive planar components or sectors which together form respectively convex and concave dispositions.

As used in the present specification the terms "convex and concave dispositions" include both convexly and concavely arced surfaces as well as surfaces which are formed of a plurality of successive planar components or sectors which together form respectively convex and concave dispositions.

According to a further aspect of the present invention there is provided an insert holder for use with a cutting insert in accordance with the invention and having a pair of integrally formed jaws defining between them a receiving slot within which is adapted to be received and clamped said insert, a lower one of said jaws defining together with an adjacent outer edge of the holder an angle of at least 90°.

Thus, the provision of a cutting insert shaped in accordance with the invention facilitates the use of an insert holder having a lower jaw which defines with the adjacent holder edge an angle of at least 90° and in this way the tool holder is substantially strengthened so as to withstand strains exerted thereon during cutting.

BRIEF SUMMARY OF THE DRAWINGS

For a better understanding of the present invention and to show how the same may be carried out in practice, reference will now be made to the accompanying drawings in which:

FIG. 6 is a plan view from above of the tool holder shown in FIG. 5,

FIG. 7 is a longitudinally sectioned view of a detail of the tool holder shown in FIG. 6, and FIG. 8 is the detail shown in FIG. 7 with a clamping screw inserted.

DETAILED DESCRIPTION OF PREFERRED EMBODIMENTS

Figure 1:
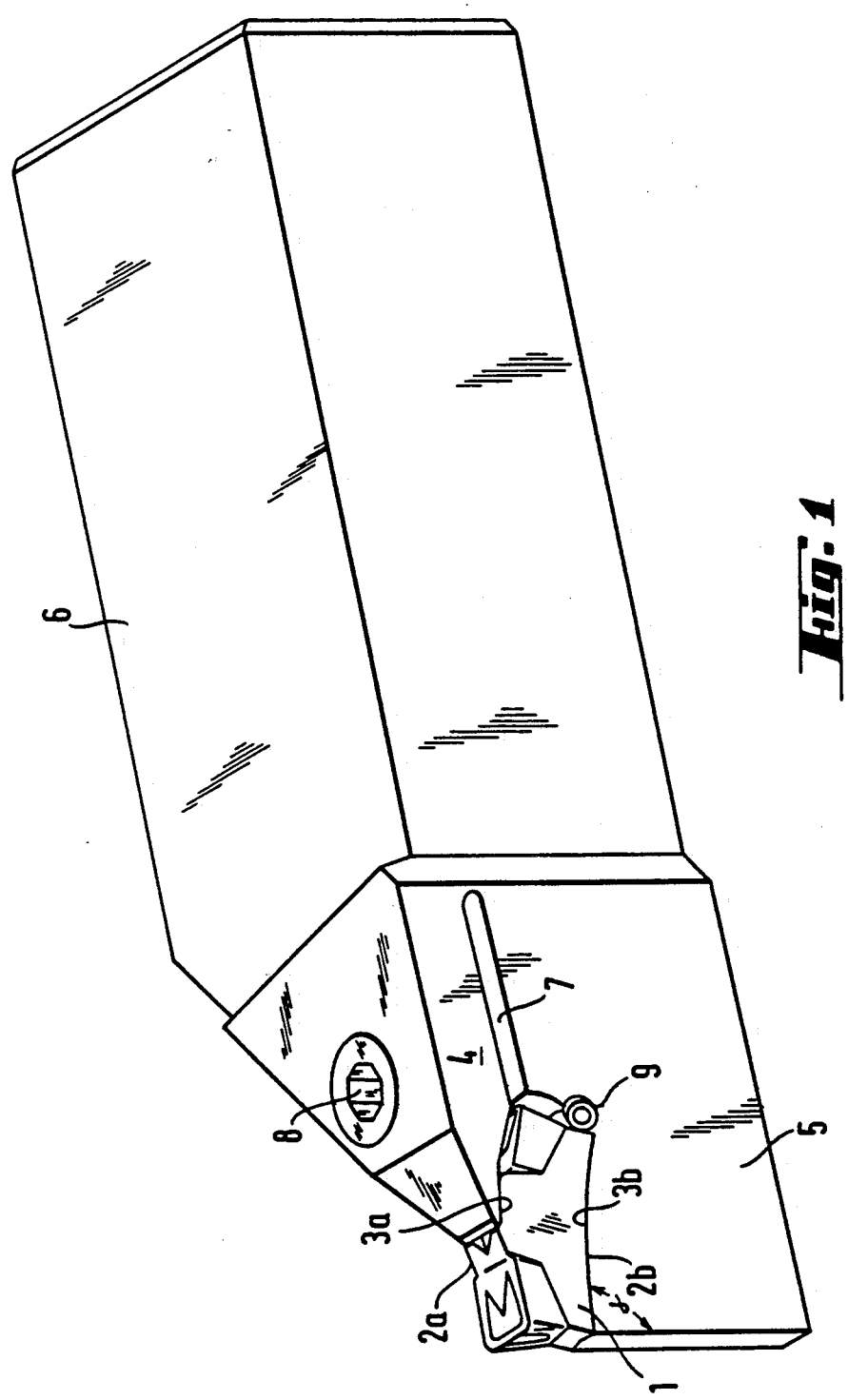
FIG. 1 is a perspective view of a turning tool system incorporating a cutting insert and tool holder in accordance with the invention.

Reference will first be made to FIG. 1 of the drawings, wherein is illustrated the mode of mounting of a multidirectional tool insert in a tool holder. As can be seen in the Figure, a multidirectional cutting tool insert 1 (the detailed possible constructions of which will be described below with reference to the remaining Figures), having substantially coaxial, longitudinally directed, upper convex and lower concave surfaces 2a and 2b, is clamped between correspondingly shaped surfaces 3a and 3b of jaws 4 and 5 formed integrally with a tool holder body 6, the surfaces 3a and 3b defining a receiving slot designed to receive the insert 1. This receiving slot communicates with a rearwardly directed slit 7, the provision of which allows for the necessary resilience required for clamping. The insert 1 is firmly clamped within the receiving slot by means of a clamping screw 8 which, when tightened, causes the jaws 4 and 5 clampingly to bear against the corresponding surfaces 2a and 2b of the insert. The surfaces 2a and 2b are respectively formed with longitudinally extending V-shaped faces in which mate corresponding convex V-shaped ribs formed of the corresponding jaw surfaces 3a and 3b. By virtue of the concave to convex mating of the ribs of the jaws 4 and 5 with the surfaces 2a and 2b, lateral movement of the insert with respect to the insert holder 6 is prevented.

As can be seen in the drawing there is located in the inner corner of the receiving slot an abutment pin 9 which serves to limit the degree of insertion of the insert 1 into the slot thereby preventing an innermost cutting end of the insert from contacting the end of the slot.

Figure 2:
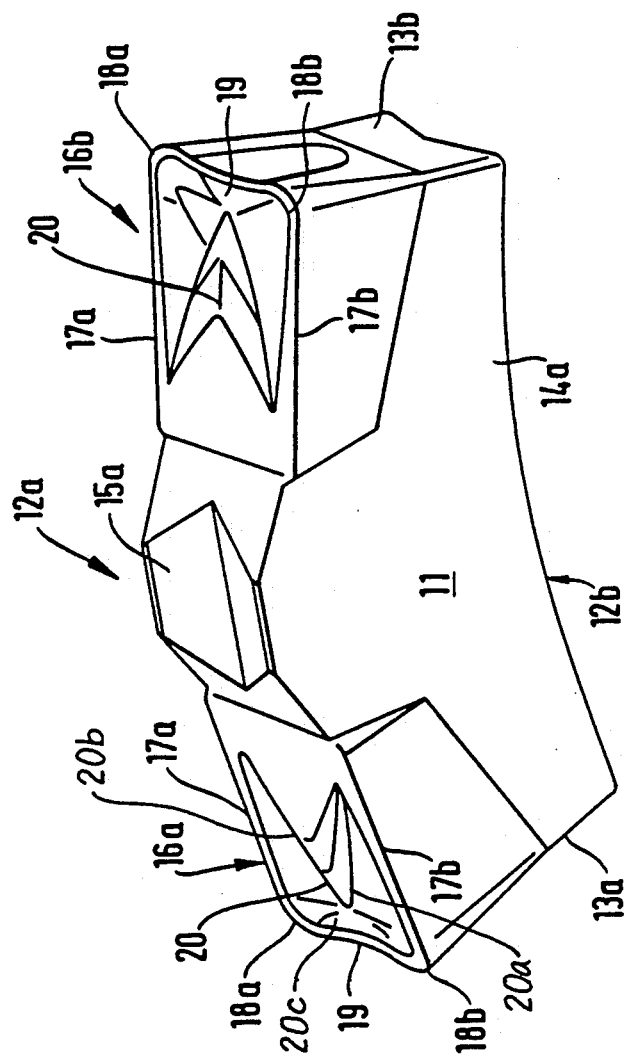
FIG. 2 is a perspective view from above of a first form of cutting insert in accordance with the invention.
Figure 3:
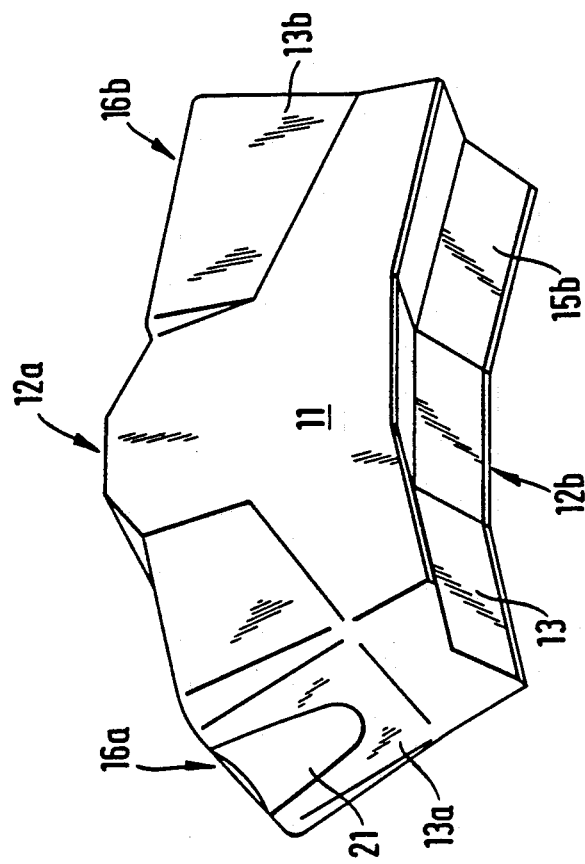
FIG. 3 is a perspective view from below of the insert shown in FIG. 2.

Reference will now be made to FIGS. 2 and 3 of the drawings for a detailed description of one embodiment of a cutting insert 11 in accordance with the invention.

As seen in the drawings, the cutting insert consists of a polygonal body with substantially convex and concave top and bottom faces 12a and 12b. The insert furthermore has front and rear peripheral faces 13a and 13b and side peripheral faces 14a and 14b. The top and bottom faces 12a and 12b are formed with longitudinally extending concave keying grooves 15a and 15b of V-shaped cross-section.

The insert is formed at diametrically opposite corners thereof with respective cutting ends 16a and 16b which, when the insert 11 is mounted on the insert holder as shown in FIG. 1 of the drawings, are alternately exposed for use. The cutting ends 16a and 16b are of identical construction and one of them (16a) will now be described.

At the intersection of the upper face 12a and the side peripheral faces 14a and 14b are formed first and second side cutting edges 17a and 17b which respectively extend from insert corners 18a and 18b to an intermediate position along the insert 11. Formed at the intersection of the upper face 12a and the front peripheral face 13a is a curved front cutting edge 19 which extends between the corners 18a and 18b. The cutting end 16a is furthermore provided with a centrally located chip forming ridge 20 which is separated from the front cutting edge 19 and the side cutting edges 17a and 17b by respective front and side rake surfaces 20a, 20b and 20c. The front peripheral face 13a is formed with a clearance recess 21.

The inserts are all formed so as to be slightly wider at their upper faces 12a than at their lower faces 12b. Furthermore, when referring to the upper and lower faces 12a and 12b of the inserts 11 as being respectively convex and concave, it is to be understood that this term applies both when the convexity and concavity are reflected in continuous curved arcs 22 as shown in FIGS. 2 and 3 of the drawings, or where the concavity is formed by a succession of planar sectors 23 as shown in FIG. 4 of the drawings.

Figure 4:
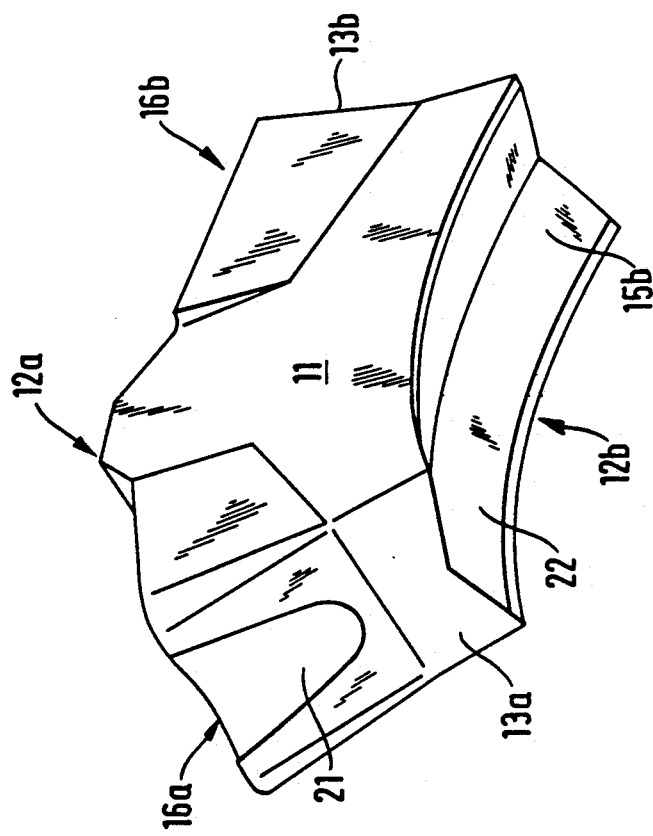
FIG. 4 is a perspective view from below of a modified insert in accordance with the invention.

Furthermore, whilst FIGS. 2 through 4 show the insert 11 as being provided with concave keying grooves 15a and 15b, it will be appreciated that the insert could equally well be provided with one or two convex keying ribs which would be adapted to mate within corresponding keying grooves formed in the jaws of the tool holder.

Figure 5:
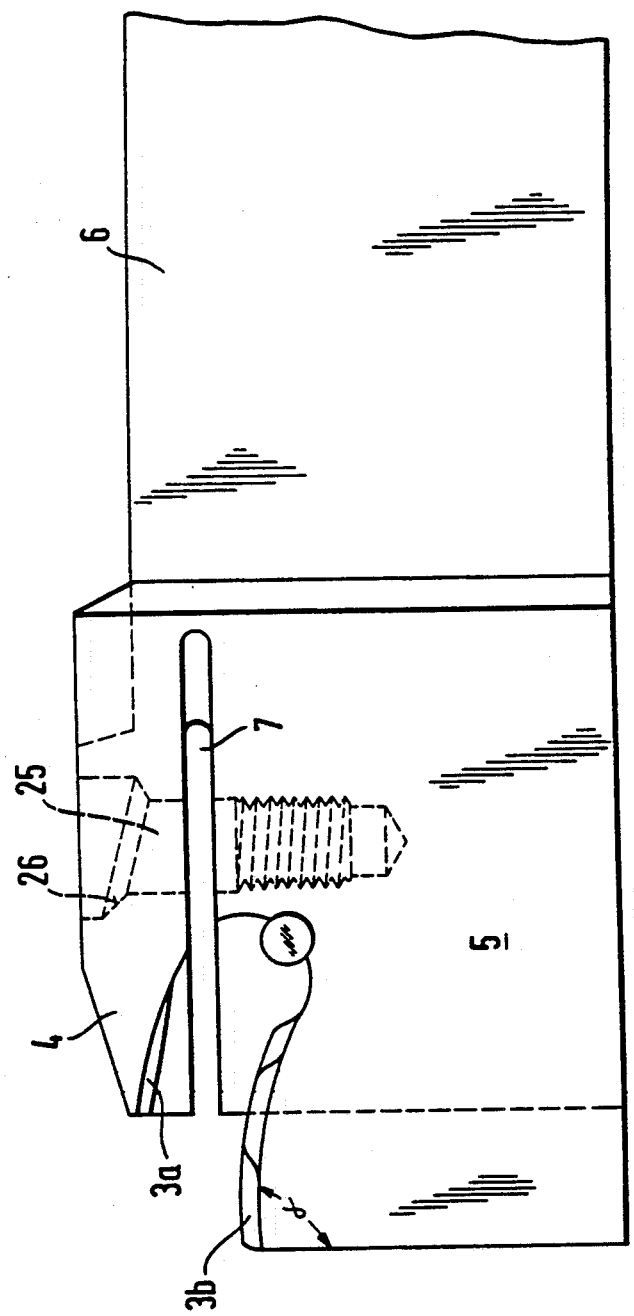
FIG. 5 is a side elevation of a tool holder in accordance with the invention.

FIG. 5 of the drawings shows how the tool holder 6 is formed with jaw surfaces 3a and 3b and, as can be seen in the case of the lower surface 3b, it is formed of planar sectors to conform with the planar sectors forming the concave surface of the insert.

The provision of the cutting insert 11 with the curved front cutting edge 19 as well as the provision of the clearance recess 21 are to ensure that, when the insert 11 is employed for laterally directed turning, the front cutting edge 11 and the front peripheral face 13 makes minimal contact with the workpiece thereby reducing frictional resistance.

Reference will now be made to FIGS. 6, 7 and 8 of the drawings for a description of the novel mode of clamping of the insert employed in accordance with the present invention.

As can be clearly seen from FIG. 6 of the drawings, the jaws 4 and 5 of the tool holder are joined to each other and to the tool holder itself along a line 24 which is directed at an acute angle to a longitudinal axis of the tool holder body 6. Furthermore, and as can be clearly seen in FIGS. 7 and 8 of the drawings, the clamping screw 8 is designed to fit into a bore 25 formed with an abutment shoulder 26 which is angularly displaced with respect to the upper surface of the jaw 4. In this way it is ensured that when the clamping screw 8 is tightened it clampingly abuts an upper portion of the shoulder and in consequence the jaw 4 is biased downwardly in the direction of a line 27 so that a jaw tip 28 exerts maximum clamping pressure on the upper surface of the insert 11. In this way it is ensured that the insert 11 is not subjected to laterally directed displacement as a result of the downward clamping of the upper jaw 4.

As can be seen in FIG. 1 of the drawings, the lower jaw 5 defines an angle with the front edge of the tool holder which is of at least 90° obtuse and in this way the lower jaw 5 is provided with an increased resistance to the strains which are normally exerted on it when the tool is used in cutting. This provision of the lower jaw with the obtuse angle is facilitated by the particular shaping of the insert in accordance with the invention.

I claim:

1. A metal cutting tool for use in parting, grooving or turning operations and comprising: a tool holder; upper and lower clamping jaws of the tool holder defining therebetween an insert receiving slot; respective clamping surfaces of said jaws; the clamping surface of a lower jaw defining an angle of at least 90° with an adjacent outer edge of the tool holder when viewed from the side of the tool holder; a cutting insert of elongated substantially prismatic shape received within said receiving slot and having top and bottom faces of respectively substantially convex and concave disposition with respect to an axis transverse to a longitudinal axis of the insert and front, rear and a pair of side peripheral faces; a first cutting end of said insert and having a front cutting edge formed at the intersection of the top face and the front peripheral face; first and second side cutting edges formed respectively at the intersections of the top face and the two side peripheral faces; chip forming means for shaping chips produced in said operations and located on said top face within an area defined by said cutting edges; front and side rake surfaces respectively separating said cutting edges from said chip forming means; and clamping means for clamping said clamping surfaces against said front and bottom faces.

2. A metal cutting tool according to claim 1, wherein said clamping surfaces and said front and bottom faces are respectively formed with keying means.

3. A metal cutting insert for use with a metal cutting tool for use in parting, grooving or turning operations and being of the type including a tool holder; upper and lower clamping jaws of the tool holder defining therebetween an insert receiving slot; respective clamping surfaces of the jaws; and the clamping surface of a lower jaw defining an angle of at least 90° with an adjacent outer edge of the tool holder when viewed from the side of the tool holder, said metal cutting insert being of an elongated substantially prismatic shape having top and bottom faces of respectively convex and concave disposition with respect to an axis transverse to a longitudinal axis of the insert and front, rear and a pair of side peripheral faces; a first cutting end of said insert and having a front cutting edge formed at the intersection of the top face and the front peripheral face and first and second side cutting edges formed respectively at the intersections of said top face and the two side peripheral faces; chip forming means for shaping chips produced in said operations and located on said top face within an area defined by said cutting edges; and front and side rake surfaces respectively separating said cutting edges from said chip forming means.

4. The metal cutting insert according to claim 3 wherein said bottom face is of a continuous, arcuately curved disposition.

5. The metal cutting insert according to claim 3 wherein said bottom face is formed of a succession of planar sections.

6. The metal cutting insert according to claim 3 wherein said top and bottom faces are formed with keying grooves.

7. The metal cutting insert according to claim 3 wherein said insert is formed with a second cutting end located at an end of the insert opposite to the first cutting end.

8. The metal cutting insert according to claim 3 wherein said front cutting edge is curved.

9. The metal cutting insert according to claim 8 wherein said front peripheral face is recessed in the region of the front cutting edge.

* * * * *